US008065115B2

(12) United States Patent
Chen

(10) Patent No.: US 8,065,115 B2
(45) Date of Patent: Nov. 22, 2011

(54) METHOD AND SYSTEM FOR IDENTIFYING AUDIBLE NOISE AS WIND NOISE IN A HEARING AID APPARATUS

(75) Inventor: Yin-Shan Chen, Taiwan (CN)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 12/376,230

(22) PCT Filed: Sep. 27, 2007

(86) PCT No.: PCT/JP2007/069401
§ 371 (c)(1),
(2), (4) Date: Feb. 3, 2009

(87) PCT Pub. No.: WO2008/041730
PCT Pub. Date: Apr. 10, 2008

(65) Prior Publication Data

US 2009/0306937 A1 Dec. 10, 2009

(30) Foreign Application Priority Data

Sep. 29, 2006 (CN) .......................... 2006 1 0141463

(51) Int. Cl.
*H04R 25/00* (2006.01)
*H04B 15/00* (2006.01)

(52) U.S. Cl. ...... 702/191; 702/189; 381/94.1; 381/71.1; 381/56; 381/58; 381/317

(58) Field of Classification Search ................... 702/191
See application file for complete search history.

(56) References Cited

U.S. PATENT DOCUMENTS 6,741,714 B2 5/2004 Jensen
6,882,736 B2 4/2005 Dickel et al.
2002/0005857 A1 1/2002 Kasahara et al.
2002/0037088 A1 * 3/2002 Dickel et al. .................. 381/317
2004/0161120 A1 8/2004 Petersen et al.
2005/0078842 A1 4/2005 Vonlanthen et al.
2005/0213778 A1 9/2005 Buck et al.
(Continued)

FOREIGN PATENT DOCUMENTS

EP 1519626 3/2005
(Continued)

*Primary Examiner* — Jonathan Teixeira Moffat
*Assistant Examiner* — Rhadames J Alonzo Miller
(74) *Attorney, Agent, or Firm* — Greenblum & Bernstein, P.L.C.

(57) ABSTRACT

A method and system for detecting wind noise are adapted to determine whether two of a plurality of sound signals acquired by a plurality of sound receiving units include wind noise. The method includes the following steps: (a) transforming the two sound signals to their corresponding digitized sound signals including a plurality of sound frames; (b) calculating a correlation coefficient of each pair of the corresponding sound frames from the two digitized sound signals; (c) subtracting one of the digitized sound signals from the other, and transforming the resultant digitized sound signal to frequency domain; (d) selecting a frequency bin in frequency domain for each of the sound frames to serve as a frequency boundary, and calculating a dB difference, a low-frequency energy decay factor, and a low-frequency ripple number of each of the sound frames according to the frequency boundary; and (e) determining whether the correlation coefficient, the dB difference, the low-frequency energy decay factor, and the low-frequency ripple number of a respective sound frame comply with a predetermined determination rule, the two sound signals being determined to include wind noise if affirmative.

26 Claims, 6 Drawing Sheets

U.S. PATENT DOCUMENTS

2007/0030989 A1 2/2007 Kates
2008/0167952 A1* 7/2008 Blair ................................ 705/11
2008/0192948 A1 8/2008 Kan et al.
2008/0260040 A1 10/2008 Ouyang et al.
2008/0317260 A1* 12/2008 Short .............................. 381/92

FOREIGN PATENT DOCUMENTS

EP 1519626 A2 * 3/2005
EP 1581026 9/2005
EP 1750483 2/2007
EP 1750483 A1 * 2/2007

* cited by examiner

METHOD AND SYSTEM FOR IDENTIFYING AUDIBLE NOISE AS WIND NOISE IN A HEARING AID APPARATUS

TECHNICAL FIELD

The invention relates to a method and system for processing wind noise, and more particularly to a method and system for detecting wind noise.

BACKGROUND ART

For hearing impaired persons, the use of hearing aids can amplify ambient sounds to effectively help them hear the ambient sounds clearly. This is of great assistance to those hearing impaired persons in living and learning. However, although modern hearing aids are compact and are convenient to carry, hearing aids still cannot process sounds as precisely as the human ears, which can filter out annoying noise, such as wind noise caused by blowing wind. Generally speaking, when wind blows against the hearing aid, the hearing aid will amplify the sound of the wind as it is designed to, thereby producing a very loud noise. Such unexpected noise often causes much discomfort to the user. Therefore, three conventional techniques have been proposed to alleviate the problem of wind noise.

In U.S. Patent Application Publication No. US20040161120A1, entitled "Device and Method for Detecting Wind Noise," there is disclosed a method to avoid the aforesaid problem. As disclosed in said patent publication, two input signals are transmitted to a low-pass filter, and computation results of a cross correlation function and an auto-correlation function of the filtered signals are compared to detect the presence of wind noise. However, since the method disclosed in the aforesaid publication is used to detect whether signals in a fixed low-frequency distribution are low-correlated, and is not only directed to wind noise, the effect is quite unsatisfactory. This is because there are many other noises belonging to such low-correlated signals in the fixed low-frequency distribution, e.g., non-voiced speech and ambient noise in a closed room.

In addition, in U.S. Pat. No. 6,741,714B2 "Hearing Aid with Adaptive Matching of Input Transducers," there is disclosed a hearing aid device that includes a plurality of input transducers, where the input transducers have a directional characteristic under normal conditions. When one of the input transducers receives wind noise, all of the input transducers will be switched from the directional characteristic to an omni-directional characteristic so as to reduce the effect of wind noise. One of the ways to detect the presence of wind noise is to determine whether a plurality of input transducer signals at a given time point have the same sign and from that time on measure the occurrence number of these input transducer signals having opposite signs at each time point within a time interval. If the occurrence number is greater than a threshold value, a wind signal is determined. This method determines wind noise based on whether the plurality of input transducer signals have the same sign. However, since the characteristic of wind noise is not absolutely like this, the result is not accurate.

Furthermore, in U.S. Pat. No. 6,882,736B2 "Method for Operating a Hearing Aid or Hearing Aid System, and a Hearing Aid and Hearing Aid System," another method for detecting wind noise is disclosed. The concept of said patent is to calculate the correlation of a plurality of input signals by subtracting one input signal from another input signal. The higher the correlation between the signals is, the smaller the average value of the results after subtraction will be. If the average value is greater than a threshold value, this indicates the presence of wind noise. Since said patent determines the correlation of the input signals merely with simple calculations, wind noise cannot be accurately detected.

All of the three above-mentioned prior art techniques fail to accurately detect wind noise and may mistake other types of noise for wind noise, thereby incurring incorrect processing. Therefore, there is a need for a solution.

DISCLOSURE OF INVENTION

Therefore, one object of the present invention is to provide a method for detecting wind noise.

Accordingly, the method for detecting wind noise of the present invention is adapted to determine whether two of a plurality of sound signals acquired by a plurality of sound receiving units include wind noise. The method includes the following steps. First, the two sound signals are transformed to their corresponding digitized sound signals including a plurality of sound frames. Then, a correlation coefficient of each pair of the corresponding sound frames from the two digitized sound signals is calculated. Next, one of the two digitized sound signals is subtracted from the other, and the resultant signal is transformed to frequency domain. Subsequently, a frequency bin in frequency domain is selected for each of the sound frames to serve as a frequency boundary, and a dB difference, a low-frequency energy decay factor, and a low-frequency ripple number of each of the sound frames is calculated according to the frequency boundary. Thereafter, a determination is made as to whether the correlation coefficient, the dB difference, the low-frequency energy decay factor, and the low-frequency ripple number of a respective sound frame comply with a predetermined determination rule, the two sound signals being determined to include wind noise if affirmative.

Another object of the present invention is to provide a system for detecting wind noise.

Accordingly, the system for detecting wind noise of the present invention is adapted to determine whether two of a plurality of sound signals acquired by a plurality of sound receiving units include wind noise. The system includes a sound signal transforming unit, a correlation coefficient calculating unit, a sound signal separating unit, a spectrum processing unit, and a determining unit.

The sound signal transforming unit transforms the two sound signals to their corresponding digitized sound signals including a plurality of sound frames. The correlation coefficient calculating unit is used to calculate a correlation coefficient of each pair of the corresponding sound frames from the two digitized sound signals. The sound signal separating unit is used to subtract one of the two digitized sound signals from the other, and to transform the resultant signal to frequency domain. The spectrum processing unit is used to select a frequency bin in frequency domain for each of the sound frames to serve as a frequency boundary, and to calculate a dB difference, a low-frequency energy decay factor, and a low-frequency ripple number of each of the sound frames according to the frequency boundary. The spectrum processing unit includes a frequency boundary determining module, a dB difference calculating module, an energy decay calculating module, and a ripple number calculating module. The determining unit is used to determine whether the two sound signals include wind noise based on whether the correlation coefficient, the dB difference, the low-frequency energy decay factor, and the low-frequency ripple number of a respective sound frame comply with a predetermined determination rule.

The advantageous effect of this invention is that it can accurately detect wind noise, and effectively help a hearing aid decide the sound signals that need filtering without affecting the operating efficiency thereof.

BRIEF DESCRIPTION OF DRAWINGS

Other features and advantages of the present invention will become apparent in the following detailed description of the preferred embodiment with reference to the accompanying drawings, of which.

BEST MODE FOR CARRYING OUT THE INVENTION

Figure 1:
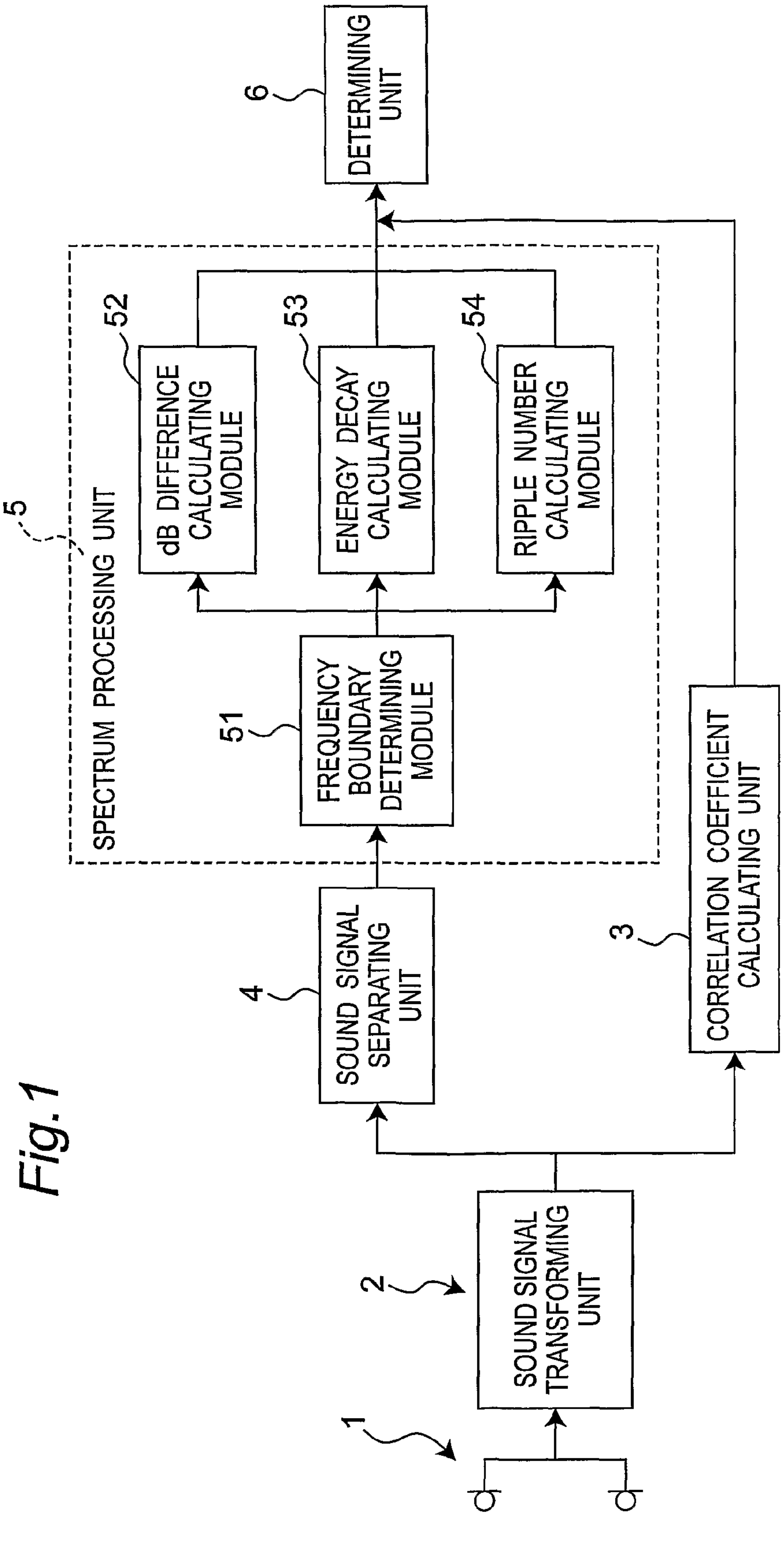
FIG. 1 is a system block diagram to illustrate a preferred embodiment of a system for detecting wind noise according to the present invention.

Referring to FIG. 1, the preferred embodiment of a system for detecting wind noise according to the present invention is adapted to determine whether two sound signals of a plurality of sound signals acquired by a plurality of sound receiving units 1 include wind noise. In this preferred embodiment, the number of the sound receiving units 1 is two and therefore, two sound signals will be acquired. The system includes a sound signal transforming unit 2, a correlation coefficient calculating unit 3, a sound signal separating unit 4, a spectrum processing unit 5, and a determining unit 6.

The sound signal transforming unit 2 is electrically connected to the sound receiving units 1 to receive the two sound signals and to transform the same to their corresponding digitized sound signals including a plurality of sound frames.

The correlation coefficient calculating unit 3 is electrically connected to the sound signal transforming unit 2. The purpose of the correlation coefficient calculating unit 3 is to calculate a correlation coefficient of each pair of the corresponding sound frames from the two digitized sound signals, where a smaller correlation coefficient value indicates a higher possibility of wind noise. The correlation coefficient calculating unit 3 does the calculation using the following Equation (1):

$$r = \frac{\sum_{i=1}^{N} (x_i - \overline{x}) \times (y_i - \overline{y})}{\sqrt{\sum_{i=1}^{N} (x_i - \overline{x})^2} \times \sqrt{\sum_{i=1}^{N} (y_i - \overline{y})^2}} \tag{1}$$

where r represents the correlation coefficient; N is the number of time slices for each sound frame, which is equal to 1024 in this preferred embodiment; x and y respectively represent the two digitized sound signals; and $\overline{x}$ and $\overline{y}$ respectively represent mean values of the two digitized sound signals.

The sound signal separating unit 4 is electrically connected to the sound signal transforming unit 2, and receives the two digitized sound signals. The purpose of the sound signal separating unit 4 is to subtract one of the two digitized sound signals from the other, and to transform the resultant signal to frequency domain using a fast Fourier transform (FFT). The transformation to frequency domain will aid in subsequent analysis of the two digitized sound signals.

The spectrum processing unit 5 is electrically connected to the sound signal separating unit 4. The spectrum processing unit 5 includes a frequency boundary determining module 51, a dB difference calculating module 52, an energy decay calculating module 53, and a ripple number calculating module 54. The frequency boundary determining module 51 is first utilized.

Figure 2:
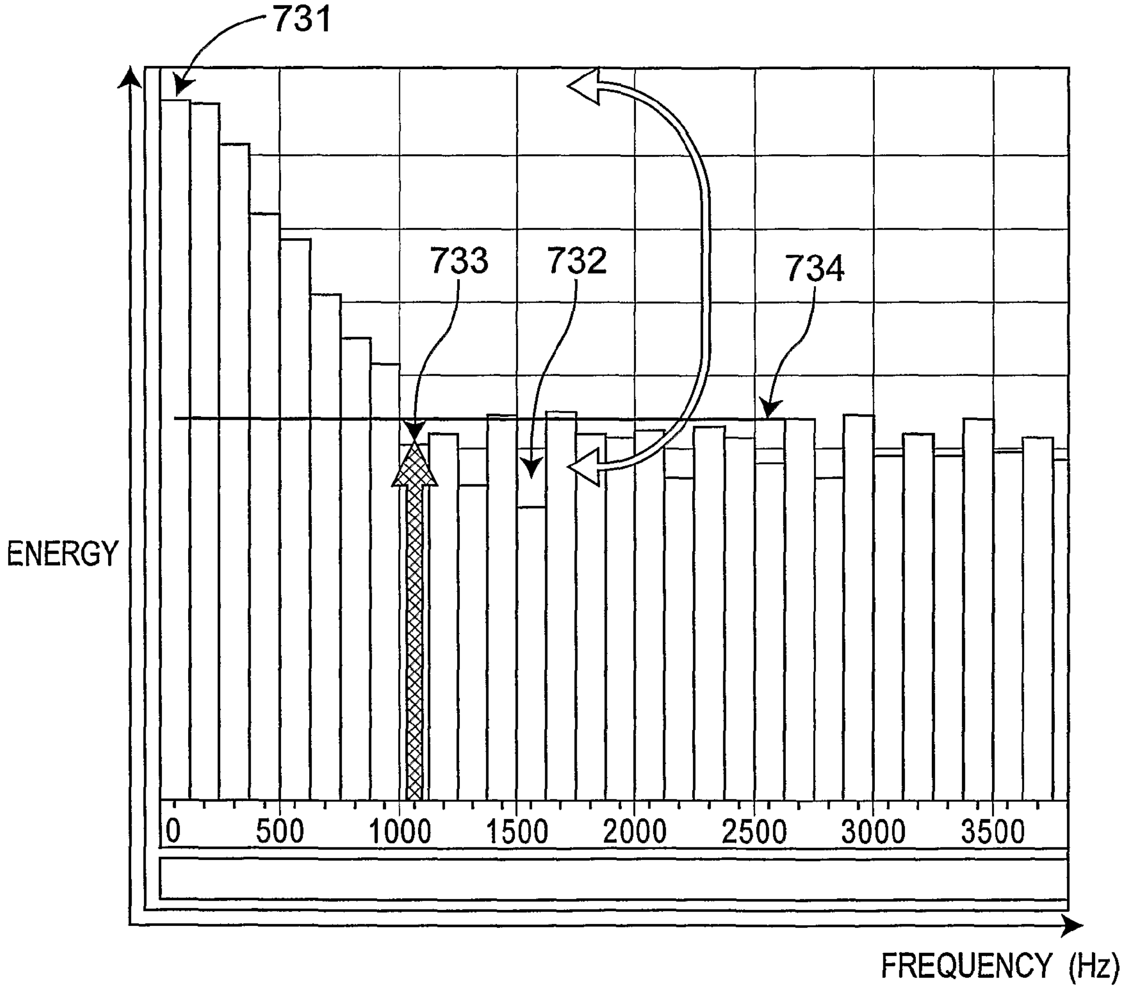
FIG. 2 is a histogram to illustrate a method for calculating a frequency boundary in the preferred embodiment.

Referring to FIGS. 1 and 2, the purpose of the frequency boundary determining module 51 is to search for a frequency boundary of each sound frame. Initially, according to a frequency bin with a maximum energy (as indicated by arrow 731) and a frequency bin with a minimum energy (as indicated by arrow 732) in each sound frame, an energy reference value is defined. The energy reference value may be defined as: (energy of the frequency bin with the maximum energy in each sound frame−energy of the frequency bin with the minimum energy in each sound frame)/10+energy of the frequency bin with the minimum energy. Thus, a line segment as indicated by arrow 734 can be obtained. Subsequently, starting from a frequency bin with the lowest frequency to a frequency bin with the highest frequency to cover all the frequency bins of each sound frame, the frequency boundary determining module 51 selects the first frequency bin whose energy is lower than the energy reference value, as indicated by arrow 733, as the frequency boundary.

Referring to FIG. 1, the dB difference calculating module 52, the energy decay calculating module 53, and the ripple number calculating module 54 of the spectrum processing unit 5 are all connected to the frequency boundary determining module 51, and can be utilized at the same time.

Figure 3:
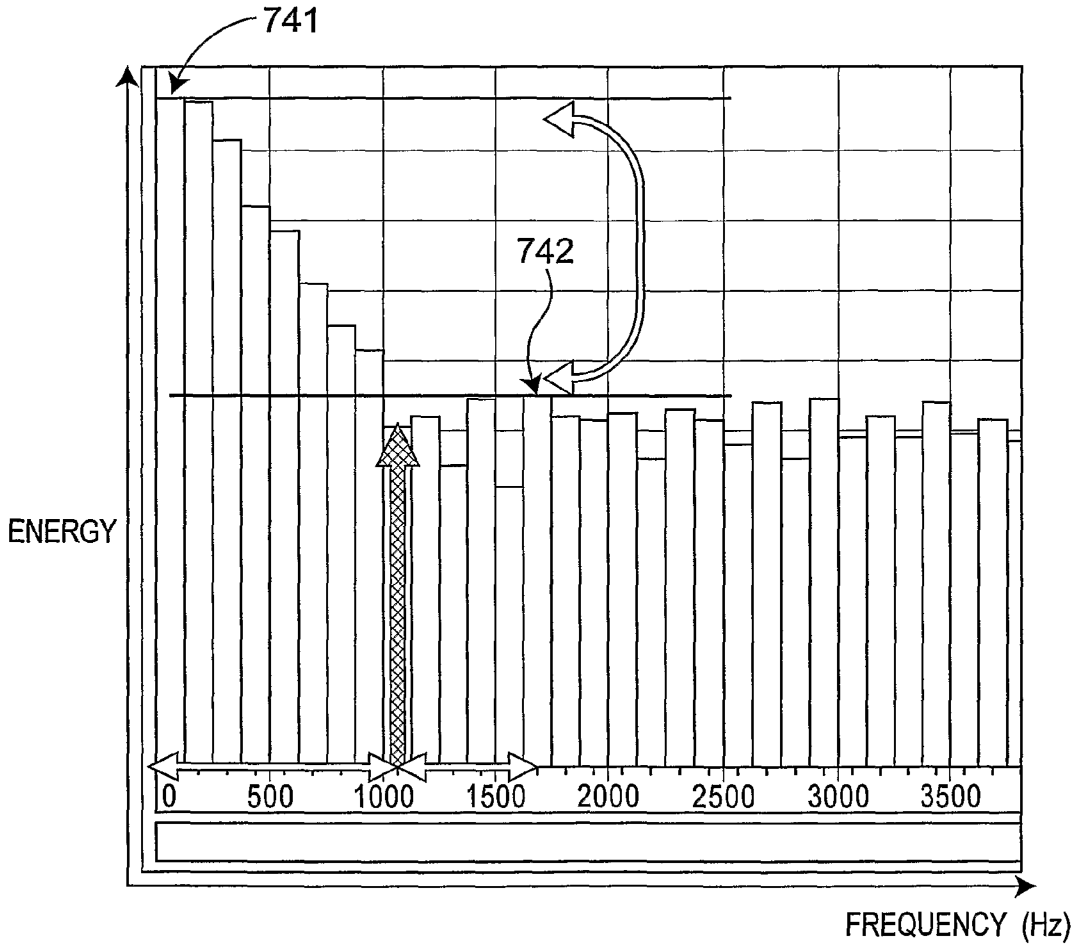
FIG. 3 is a view similar to FIG. 2, illustrating a method for calculating a dB difference in the preferred embodiment.

Referring to FIGS. 1 and 3, the dB difference calculating module 52 of the spectrum processing unit 5 calculates a dB difference according to the frequency boundary of each sound frame. The dB difference may be defined as: (energy of a frequency bin which has the maximum energy among frequency bins with frequencies lower than the frequency boundary (as indicated by arrow 741)−energy of a frequency bin which has the maximum energy among five closest frequency bins with frequencies higher than the frequency boundary (as indicated by arrow 742).

Figure 4:
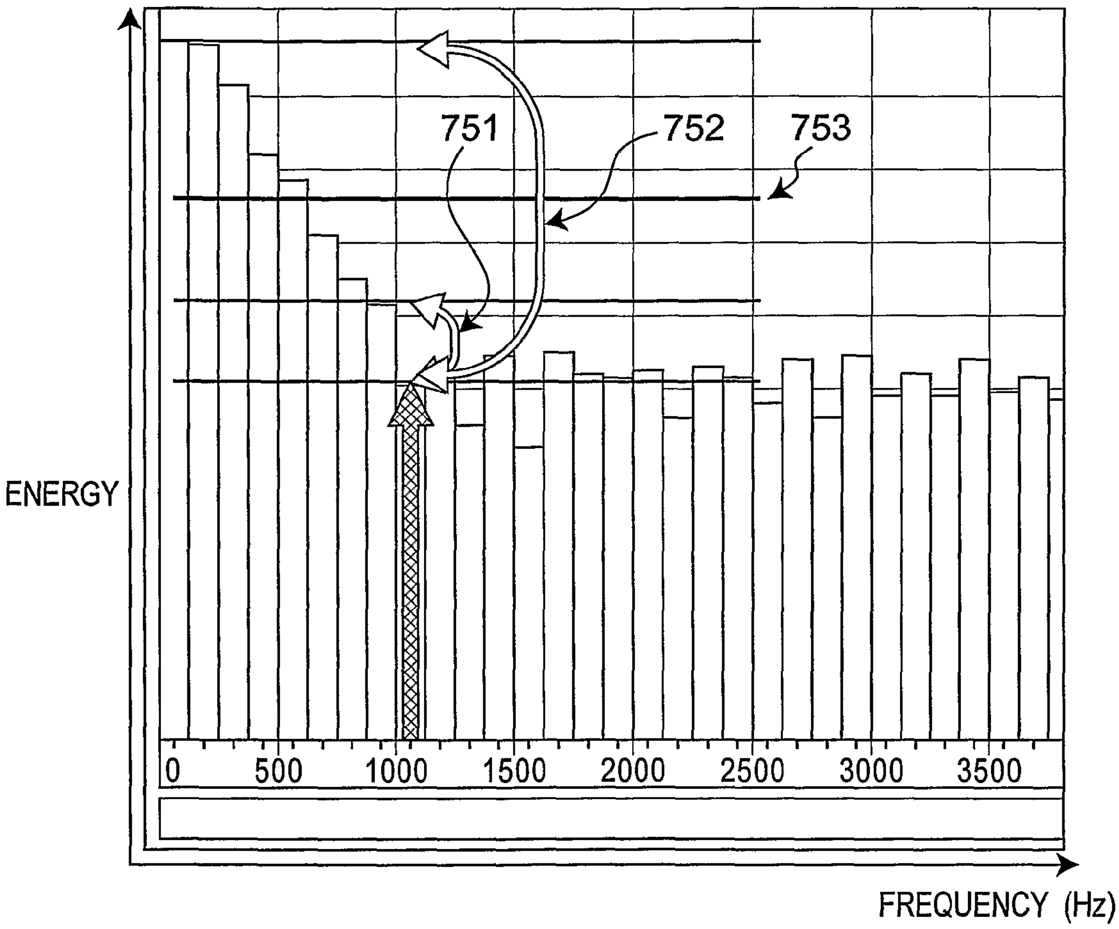
FIG. 4 is a view similar to FIG. 2, illustrating a method for calculating a low-frequency energy decay factor in the preferred embodiment.

Referring to FIGS. 1 and 4, the energy decay calculating module 53 of the spectrum processing unit 5 calculates a low-frequency energy decay factor according to the frequency boundary of each sound frame. The low-frequency energy decay factor may be defined as: (energy of a frequency bin whose frequency is lower than the frequency boundary and which is closest to the frequency boundary−energy of the frequency boundary)(as indicated by arrow 751)−(energy of a frequency bin which has the maximum energy among frequency bins with frequencies lower than the frequency boundary−energy of a frequency bin which has the minimum energy among frequency bins with frequencies lower than the frequency boundary)/2 (i.e., halving the difference value indicated by arrow 752 to obtain a value indicated by arrow 753).

Figure 5:
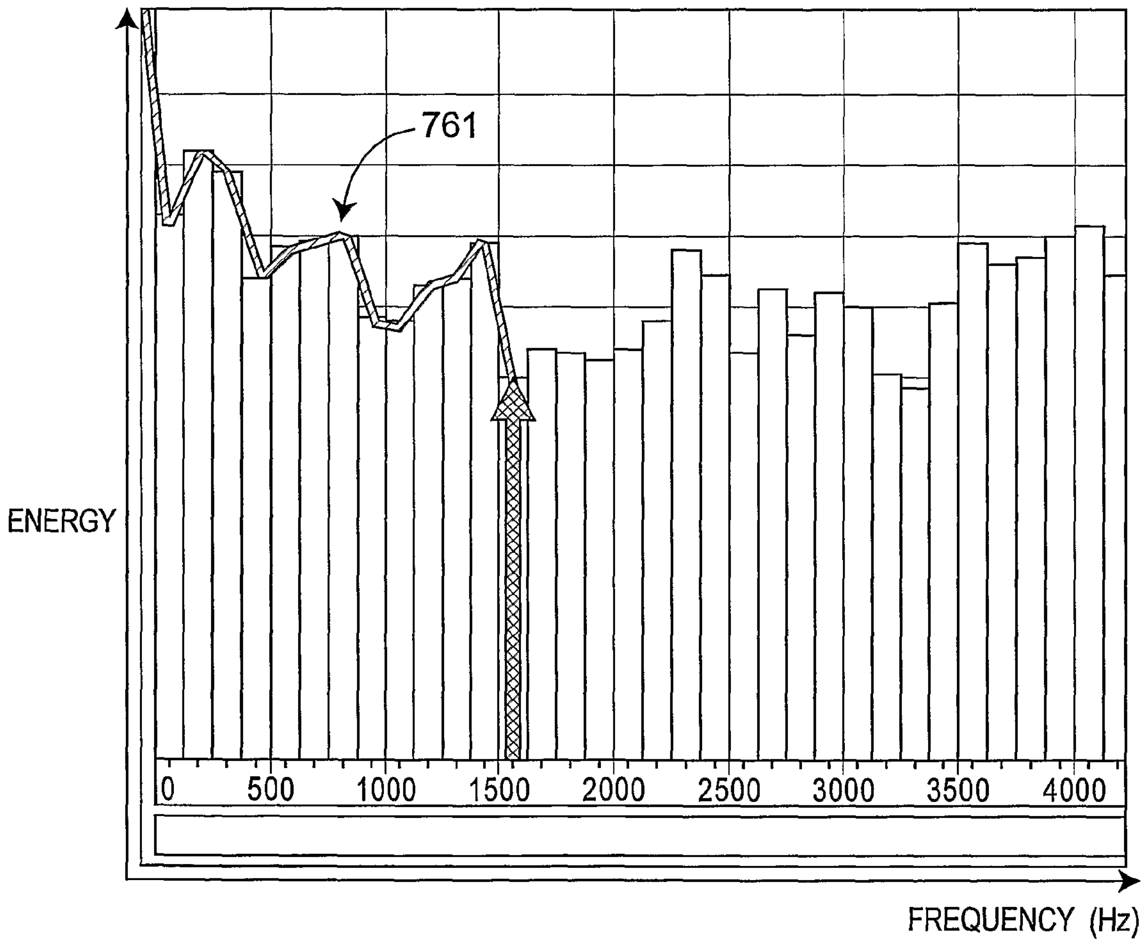
FIG. 5 is a view similar to FIG. 2, illustrating a method for calculating a low-frequency ripple number in the preferred embodiment.

Referring to FIGS. 1 and 5, the ripple number calculating module 54 of the spectrum processing unit 5 calculates a low-frequency ripple number according to the frequency boundary of each sound frame. The low-frequency ripple number may be defined as: number of times of (energy difference between any two adjacent frequency bins whose frequencies are lower than the frequency boundary)>(energy of a frequency bin which has the maximum energy among frequency bins with frequencies lower than the frequency boundary−energy of a frequency bin which has the minimum energy among frequency bins with frequencies lower than the frequency boundary)/100. Taking the sound frame shown in FIG. 5 as an example, arrow 761 indicates that there are obvious ripples in the sound frame, and it can be known that the number of ripples is three.

The determining unit 6 is used to determine whether the two sound signals include wind noise based on whether the correlation coefficient, the dB difference, the low-frequency energy decay factor, and the low-frequency ripple number of a respective sound frame comply with a predetermined determination rule. In this embodiment, the predetermined determination rule may be that the correlation coefficient is smaller than 0.9, the dB difference is greater than 17.4 decibels, the low-frequency energy decay factor is a negative number, and the ripple number is 0. Experimentation has shown that the predetermined determination rule thus set can most effectively enhance the wind noise detecting capability of the system.

Figure 6:
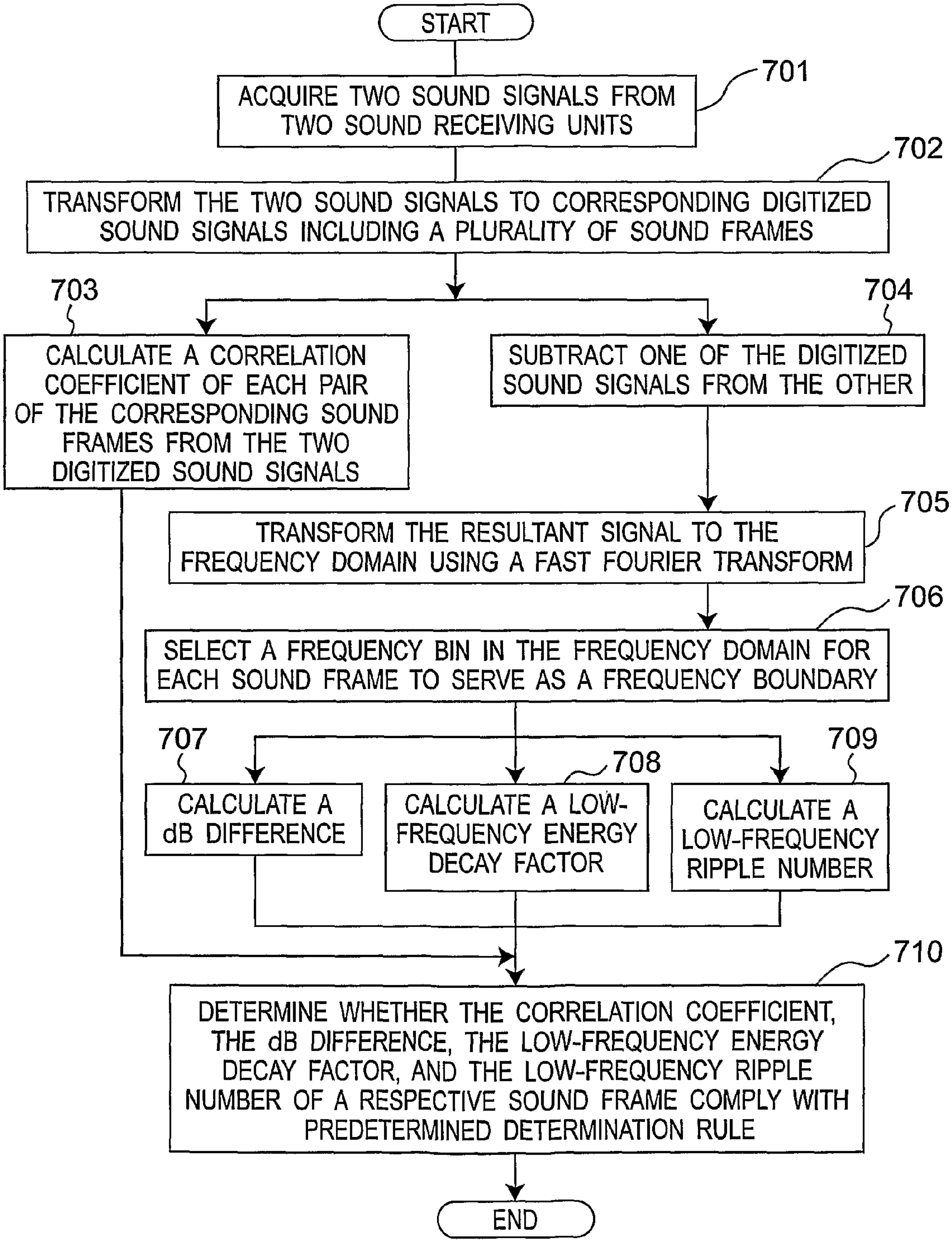
FIG. 6 is a flowchart to illustrate a preferred embodiment of a method for detecting wind noise according to the present invention.

Referring to FIGS. 1 and 6, the method for detecting wind noise according to the present invention includes the following steps:

First, in step 701, the sound receiving units 1 acquire two sound signals.

Next, in step 702, the two sound signals are transformed to their corresponding digitized sound signals including a plurality of sound frames using the sound signal transforming unit 2.

Subsequently, in step 703, which is performed by the correlation coefficient calculating unit 3, a correlation coefficient of each pair of the corresponding sound frames from the two digitized sound signals is calculated using the aforesaid Equation (1).

Thereafter, in step 704, the sound signal separating unit 4 subtracts one of the two digitized sound signals from the other. Next, in step 705, the resultant signal is transformed to frequency domain using a fast Fourier transform.

Subsequently, in step 706, the frequency boundary determining module 51 of the spectrum processing unit 5 selects a frequency bin in frequency domain for each sound frame to serve as a frequency boundary. The method of selecting the frequency boundary includes the following sub-steps:

First, a frequency bin with a maximum energy and a frequency bin with a minimum energy in each sound frame are located, and an energy reference value is defined. The energy reference value is defined as: (energy of the frequency bin with the maximum energy in each sound frame−energy of the frequency bin with the minimum energy in each sound frame)/10+energy of the frequency bin with the minimum energy.

Thereafter, starting from a frequency bin with the lowest frequency to a frequency bin with the highest frequency to cover all the frequency bins of each sound frame, the first frequency bin whose energy is lower than the energy reference value is selected as the frequency boundary.

Afterwards, the dB difference, the low-frequency energy decay factor, and the low-frequency ripple number must be found according to the frequency boundary.

In step 707, the dB difference calculating module 52 of the spectrum processing unit 5 calculates the dB difference according to the frequency boundary of each sound frame. In step 708, the energy decay calculating module 53 of the spectrum processing unit 5 calculates the low-frequency energy decay factor according to the frequency boundary of each sound frame. In step 709, the ripple number calculating module 54 of the spectrum processing unit 5 calculates the low-frequency ripple number according to the frequency boundary of each sound frame.

Finally, in step 710, the determining unit 6 determines whether the correlation coefficient, the dB difference, the low-frequency energy decay factor, and the low-frequency ripple number of a respective sound frame comply with the predetermined determination rule. The predetermined determination rule includes the correlation coefficient smaller than 0.9, the dB difference greater than 17.4 decibels, the low-frequency decay factor being a negative number, and the ripple number being 0. If the predetermined determination rule is met, it is determined that the two sound signals include wind noise.

In sum, wind noise can be accurately detected using the system and method of the present invention. A comparison among the preferred embodiment of this invention and the hearing aids of U.S. Pat. Nos. 6,741,714B2 and 6,882,736B2 reveals the results shown in Table 1. Figures in boldface represent the best wind noise detecting effect among the three.

TABLE 1

| Wind noise present? | Test sound samples | U.S. Pat. No. 6,741,714 B2 | U.S. Pat. No. 6,882,736 B2 | Present invention |
|---|---|---|---|---|
| Yes | Subway 1 | 28.04% | 18.627% | **47.091%** |
| Yes | Subway 2 | 61.275% | 28.396% | **81.842%** |
| Yes | Subway 3 | 2.682% | 0.056% | **5.245%** |
| Yes | Air-conditioner | 0.00582% | 0.031% | **0.017%** |
| No | Concert hall | 0.103% | 0.097% | **0%** |
| No | Entrance of department store | 0% | 0% | **0%** |
| Yes | Entrance | 12.806% | 6.506% | **7.786%** |
| No | Fountain square | 0.056% | **0%** | **0%** |
| No | Conference room | 1.363% | **0%** | 0.578% |
| No | Restaurant | 0.135% | **0%** | 0.135% |
| Yes | Road | 1.01% | 0.307% | **2.302%** |
| Yes | Station | 1% | 1.164% | **2.456%** |
| No | Studio | 22.1755% | **0.06%** | 0.36% |
| No | Supermarket | 0% | **0%** | 0.073% |
| No | Underground shopping mall | 0.061% | **0%** | **0%** |
| No | Store | 0.173% | **0%** | **0%** |

It can be observed from Table 1 that, when wind noise is present, this invention is the most probable one to detect the wind noise, and when wind noise is not present, this invention is of a very low probability to detect wind noise, which shows evidence of better wind noise detection effects for this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to the method and system for detecting wind noise.

The invention claimed is:

1. A method for detecting wind noise, which is adapted to determine whether two of a plurality of sound signals acquired by a plurality of sound receiving units include wind noise, comprising:

transforming, via a sound signal transformer, the two sound signals to their corresponding digitized sound signals including a plurality of sound frames;

calculating, via a correlation coefficient calculator, a correlation coefficient of each pair of the corresponding sound frames from the two digitized sound signals;

subtracting, via a sound signal separator, one of the two digitized sound signals from another of the two digitized sound signals, and transforming a resultant signal to a frequency domain;

selecting, via a spectrum processor, a frequency bin in a frequency domain for each of the sound frames to serve as a frequency boundary, and calculating a dB difference, a low-frequency energy decay factor, and a low-frequency ripple number of each of the sound frames according to the frequency boundary; and determining whether the correlation coefficient, the dB difference, the low-frequency energy decay factor, and the low-frequency ripple number of a respective sound frame comply with a predetermined determination rule, the two sound signals being determined to include wind noise if the determining is affirmative.

2. The method of claim 1, wherein, in calculating, the correlation coefficient is calculated based on the following equation, and, in determining, the predetermined determination rule includes the correlation coefficient being smaller than a threshold value ranging from 0.8 to 1.0:

$$r = \frac{\sum_{i=1}^{N} (x_i - \overline{x}) \times (y_i - \overline{y})}{\sqrt{\sum_{i=1}^{N} (x_i - \overline{x})^2} \times \sqrt{\sum_{i=1}^{N} (y_i - \overline{y})^2}}$$

where r represents the correlation coefficient; N is a number of time slices for each sound frame; x and y, respectively, represent the two digitized sound signals; and $\overline{x}$ and $\overline{y}$, respectively, represent mean values of the two digitized sound signals.

3. The method of claim 2, wherein the number of time slices is 1024.

4. The method of claim 1, wherein, in subtracting, a fast Fourier transform is used to transform the resultant signal to the frequency domain.

5. The method of claim 1, wherein, in selecting, selection of the frequency boundary includes:

defining an energy reference value according to a frequency bin with a maximum energy and a frequency bin with a minimum energy in each of the sound frames; and selecting a first frequency bin whose energy is lower than the energy reference value as the frequency boundary, which starts from a frequency bin with a lowest frequency to a frequency bin with a highest frequency to cover all frequency bins of each of the sound frames.

6. The method of claim 5, wherein, in defining an energy reference value, the energy reference value is defined as: (energy of the frequency bin with the maximum energy in each sound frame−energy of the frequency bin with the minimum energy in each sound frame)/10+energy of the frequency bin with the minimum energy.

7. The method of claim 1, wherein, in selecting, the dB difference is calculated according to the frequency boundary of each of the sound frames, and in determining, the predetermined determination rule includes the dB difference being greater than a threshold value.

8. The method of claim 7, wherein, in selecting, the dB difference is defined as: (energy of a frequency bin which has the maximum energy among frequency bins with frequencies lower than the frequency boundary−energy of a frequency bin which has the maximum energy among a plurality of closest frequency bins with frequencies higher than the frequency boundary), and the threshold value ranges between 15 and 20 decibels.

9. The method of claim 8, wherein the closest frequency bins are 3 to 10 frequency bins with frequencies higher than the frequency boundary.

10. The method of claim 1, wherein, in selecting, the low-frequency energy decay factor is calculated according to the frequency boundary of each of the sound frames, and in determining, the predetermined determination rule includes the low-frequency energy decay factor satisfying a first predetermined condition.

11. The method of claim 10, wherein, in selecting, the low-frequency energy decay factor is defined as: (energy of a frequency bin whose frequency is lower than the frequency boundary and which is closest to the frequency boundary−energy of the frequency boundary)−(energy of a frequency bin which has the maximum energy among frequency bins with frequencies lower than the frequency boundary−energy of a frequency bin which has the minimum energy among frequency bins with frequencies lower than the frequency boundary)/2, and the first predetermined condition is that the low-frequency energy decay factor is a negative number.

12. The method claim 1, wherein, in selecting, the low-frequency ripple number is calculated according to the frequency boundary of each of the sound frames, and in determining, the predetermined determination rule includes the low-frequency ripple number satisfying a second predetermined condition.

13. The method of claim 12, wherein, in selecting, the low-frequency ripple number is defined as: number of times of (energy difference between any two adjacent frequency bins whose frequencies are lower than the frequency boundary)>(energy of a frequency bin which has the maximum energy among frequency bins with frequencies lower than the frequency boundary−energy of a frequency bin which has the minimum energy among frequency bins with frequencies lower than the frequency boundary)/100, and the second predetermined condition is that the low-frequency ripple number is 0.

14. A system for detecting wind noise, which is adapted to determine whether two of a plurality of sound signals acquired by a plurality of sound receiving units include wind noise, comprising:

a sound signal transformer that transforms the two sound signals to their corresponding digitized sound signals including a plurality of sound frames;

a correlation coefficient calculator that calculates a correlation coefficient of each pair of the corresponding sound frames from the two digitized sound signals;

a sound signal separator that separates one of the two digitized sound signals from another of the two digitized sound signals, and that transforms the resultant signal to a frequency domain;

a spectrum processor that selects a frequency bin in a frequency domain for each of the sound frames to serve as a frequency boundary and for calculating a dB difference, a low-frequency energy decay factor, and a low-frequency ripple number of each of the sound frames according to the frequency boundary, said spectrum processor including a frequency boundary determiner, a dB difference calculator, an energy decay calculator, and a ripple number calculator; and a determiner that determines whether the two sound signals include wind noise based on whether the correlation coefficient, the dB difference, the low-frequency energy decay factor, and the low-frequency ripple number of a respective sound frame comply with a predetermined determination rule.

15. The system of claim 14, wherein the correlation coefficient is calculated based on the following equation, and the predetermined determination rule includes the correlation coefficient being smaller than a threshold value ranging from 0.8 to 1.0:

$$r = \frac{\sum_{i=1}^{N} (x_i - \overline{x}) \times (y_i - \overline{y})}{\sqrt{\sum_{i=1}^{N} (x_i - \overline{x})^2} \times \sqrt{\sum_{i=1}^{N} (y_i - \overline{y})^2}}$$

where r represents the correlation coefficient; N is the number of time slices for each sound frame; x and y, respectively, represent the two digitized sound signals; and $\overline{x}$ and $\overline{y}$, respectively, represent mean values of the two digitized sound signals.

16. The system of claim 15, wherein the number of time slices is 1024.

17. The system of claim 14, wherein said sound signal separator uses a Fast Fourier Transform to transform the resultant signal to the frequency domain.

18. The system of claim 14, wherein said frequency boundary determiner of said spectrum processor defines an energy reference value according to a frequency bin with a maximum energy and a frequency bin with a minimum energy in each of the sound frames, and selects a first frequency bin whose energy is lower than the energy reference value as the frequency boundary, which starts from a frequency bin with a lowest frequency to a frequency bin with a highest frequency to cover all frequency bins of each of the sound frames.

19. The system of claim 18, wherein the energy reference value is defined as: (energy of the frequency bin with the maximum energy in each sound frame−energy of the frequency bin with the minimum energy in each sound frame)/10+energy of the frequency bin with the minimum energy.

20. The system of claim 14, wherein said dB difference calculating module of said spectrum processor calculates the dB difference according to the frequency boundary of each of the sound frames, and the predetermined determination rule includes the dB difference being greater than a threshold value.

21. The system of claim 20, wherein the dB difference is defined as: (energy of a frequency bin which has the maximum energy among frequency bins with frequencies lower than the frequency boundary−energy of a frequency bin which has the maximum energy among a plurality of closest frequency bins with frequencies higher than the frequency boundary, and the threshold value ranges between 15 and 20 decibels.

22. The system of claim 21, wherein the closest frequency bins are 3 to 10 frequency bins with frequencies higher than the frequency boundary.

23. The system of claim 14, wherein said energy decay calculator of said spectrum processor calculates the low-frequency energy decay factor according to the frequency boundary of each of the sound frames, and the predetermined determination rule includes the low-frequency energy decay factor satisfying a first predetermined condition.

24. The system of claim 23, wherein the low-frequency energy decay factor is defined as: (energy of a frequency bin whose frequency is lower than the frequency boundary and which is closest to the frequency boundary−energy of the frequency boundary)−(energy of a frequency bin which has the maximum energy among frequency bins with frequencies lower than the frequency boundary−energy of a frequency bin which has the minimum energy among frequency bins with frequencies lower than the frequency boundary)/2, and the first predetermined condition is that the low-frequency energy decay factor is a negative number.

25. The system of claim 14, wherein said ripple number calculator of said spectrum processor calculates the low-frequency ripple number according to the frequency boundary of each of said sound frames, and the predetermined determination rule includes the low-frequency ripple number satisfying a second predetermined condition.

26. The system of claim 25, wherein the low-frequency ripple number is defined as: number of times of (energy difference between any two adjacent frequency bins whose frequencies are lower than the frequency boundary)>(energy of a frequency bin which has the maximum energy among frequency bins with frequencies lower than the frequency boundary−energy of a frequency bin which has the minimum energy among frequency bins with frequencies lower than the frequency boundary)/100, and the second predetermined condition is that the low-frequency ripple number is 0.

* * * * *

UNITED STATES PATENT AND TRADEMARK OFFICE

CERTIFICATE OF CORRECTION

PATENT NO. : 8,065,115 B2
APPLICATION NO. : 12/376230
DATED : November 22, 2011
INVENTOR(S) : Y. Chen It is certified that error appears in the above-identified patent and that said Letters Patent is hereby corrected as shown below:

On Cover Page 2, Foreign Patent Documents, delete "EP 1519626 dated 3/2005" (second occurrence)

On Cover Page 2, Foreign Patent Documents, delete "EP 1750483 dated 2/2007" (second occurrence)

Signed and Sealed this
Seventeenth Day of April, 2012

David J. Kappos
*Director of the United States Patent and Trademark Office*